Oct. 11, 1927.
C. G. MUNTERS ET AL
1,645,017
ABSORPTION REFRIGERATING APPARATUS
Filed May 16, 1922
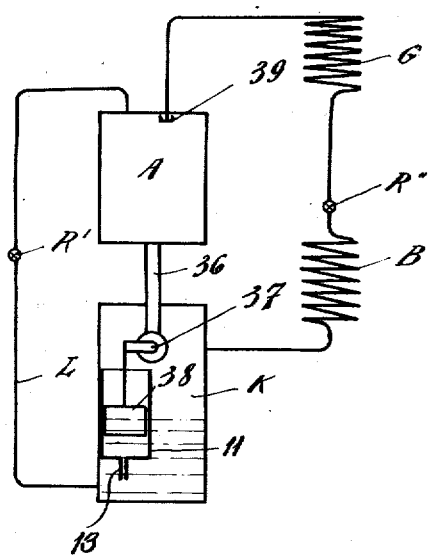

Patented Oct. 11, 1927.

1,645,017

UNITED STATES PATENT OFFICE.

CARL GEORG MUNTERS, OF DALA-JARNA, AND BALTZAR CARL VON PLATEN, OF YSTAD, SWEDEN, ASSIGNORS, BY MESNE ASSIGNMENTS, TO ELECTROLUX SERV-EL CORPORATION, A CORPORATION OF DELAWARE.

ABSORPTION REFRIGERATING APPARATUS.

Application filed May 16, 1922, Serial No. 561,364, and in Sweden December 6, 1921.

The invention relates to absorption refrigerating apparatus of the kind in which the circulation is effected automatically by periodic operation of valve mechanism controlled in response to variations of liquid level within the apparatus. In apparatus of this kind previously known, a special sluice vessel has been interposed between the absorber and generator for the purpose of regulating the periodic transfer of absorption liquid from the absorber to the generator, said sluice vessel containing the periodic operating valve mechanism. The present invention eliminates the said sluice vessel and provides apparatus and mechanism whereby the absorption liquid may be directly discharged from the absorber into the generator. The invention will be readily understood by reference to the accompanying drawing which shows one embodiment thereof. In the drawing K designates a generator or boiler which is heated in any desired manner and which contains a refrigerant, for example, ammonia, in solution, in an absorption liquid. Ammonia vapor passes from generator K into condenser coil B wherein it is condensed and from which it passes through reducing valve $R^{11}$ and thence into the evaporator or refrigerator G where heat is absorbed from the surroundings due to the evaporation of the ammonia. The ammonia then passes through check valve 39 into absorber A. Weak absorption liquid passes from the lower part of the generator K through conduit L and through reducing valve $R^1$ into the absorber A where it absorbs ammonia.

Extending from the absorber A directly into the generator K is a conduit 36. In conduit 36 and within the generator is a valve 37 controlled by a float 38 also situated within the generator and movable in response to changes of liquid level in the generator. When the level of liquid lowers below a given low value float 38 operates valve 37 to open the same. The pressure is then equalized in the generator and absorber and valve 39 closes due to the greater pressure in absorber A than in the evaporator. Liquid then flows from the absorber down into the boiler. When the level of the liquid has risen to a given high value float 38 closes valve 37 and disconnects the generator from the absorber whereupon ammonia vapor again passes to the condenser B and thence through the circuit to the absorber A.

Float 38 is arranged within a receptacle 11 open at the top and connected with the liquid space of the generator through a restricted opening 13 due to which the liquid level rises more slowly in vessel 11 than in the generator proper. The purpose of this arrangement is to insure that the absorber be entirely emptied before the float has been raised so far as to close valve 37. After valve 37 has been closed the pressure lowers in the absorber A due to absorption of the ammonia remaining in the absorber and connection is then effected between absorber A and evaporator G.

We claim:

1. In absorption refrigerating apparatus the combination of a generator, an absorber situated above said generator, a condenser and an evaporator connected so as to form closed circulating systems for the cooling agent and the absorption liquid, including a conduit directly connecting the absorber with the generator, a valve inserted in said conduit so as to be entirely enclosed within the apparatus, and means for operating said valve under the control of the variations of the liquid level in the generator, said means being entirely enclosed within the apparatus.

2. In absorption refrigerating apparatus the combination of a generator, an absorber situated above said generator, a condenser and an evaporator connected so as to form closed circulating systems for the cooling agent and the absorption liquid, including a conduit directly connecting the absorber with the generator, a valve inserted in said conduit so as to be entirely enclosed within the apparatus, a float disposed in the generator, and operating means connecting the float with said valve to cause the valve to be opened and closed periodically through the displacement of the float, said means being entirely enclosed within the apparatus.

3. In absorption refrigerating apparatus the combination of a generator, an absorber, a condenser and an evaporator connected so as to form circulating systems for the cooling agent and the absorption liquid, including a conduit directly connecting the absorber with the generator, a valve inserted in said conduit, an open vessel in the generator communicating with the liquid chamber of the generator through a narrow passage, and a float disposed in said vessel and connected with said valve so as to open and close the valve periodically.

4. In absorption refrigerating apparatus, the combination of a generator, an absorber situated above said generator, a condenser and an evaporator connected so as to form closed circulating systems for the cooling agent and the absorption liquid, including a conduit directly connecting the absorber with the generator, a valve inserted in said conduit and situated wholly within said apparatus and means responsive to the level of liquid in said generator situated wholly within said apparatus to open said valve when the level in the generator falls below a given low value and to close said valve when the liquid level in the generator rises above a predetermined high value.

5. In absorption refrigerating apparatus, the combination of a generator, an absorber, a condenser and an evaporator connected so as to form closed circulating systems for the cooling agent and the absorption liquid, including a conduit within the generator in communication with the absorber and means wholly within the generator to control flow through said conduit in response to variations of liquid level in the generator.

In witness whereof, we have hereunto signed our names.

CARL GEORG MUNTERS.
BALTZAR CARL von PLATEN.

in said conduit, an open vessel in the generator communicating with the liquid chamber of the generator through a narrow passage, and a float disposed in said vessel and connected with said valve so as to open and close the valve periodically.

4. In absorption refrigerating apparatus, the combination of a generator, an absorber situated above said generator, a condenser and an evaporator connected so as to form closed circulating systems for the cooling agent and the absorption liquid, including a conduit directly connecting the absorber with the generator, a valve inserted in said conduit and situated wholly within said apparatus and means responsive to the level of liquid in said generator situated wholly within said apparatus to open said valve when the level in the generator falls below a given low value and to close said valve when the liquid level in the generator rises above a predetermined high value.

5. In absorption refrigerating apparatus, the combination of a generator, an absorber, a condenser and an evaporator connected so as to form closed circulating systems for the cooling agent and the absorption liquid, including a conduit within the generator in communication with the absorber and means wholly within the generator to control flow through said conduit in response to variations of liquid level in the generator.

In witness whereof, we have hereunto signed our names.

CARL GEORG MUNTERS.
BALTZAR CARL von PLATEN.

DISCLAIMER.

,645,017.—*Carl Georg Munters* and *Baltzar Carl von Platen*, Dala-Jarna and Ystad, Sweden. ABSORPTION REFRIGERATING APPARATUS. Patent dated October 11, 1927. Disclaimer filed September 28, 1928, by the assignee, by mesne assignments, *Electrolux Servel Corporation.*

Hereby enters this disclaimer to claim 5 of the aforesaid patent which is in the following words, to wit:

"5. In absorption refrigerating apparatus, the combination of a generator, an absorber, a condenser and an evaporator connected so as to form closed circulating systems for the cooling agent and the absorption liquid, including a conduit within the generator in communication with the absorber and means wholly within the generator to control flow through said conduit in response to variations of liquid level in the generator."

[*Official Gazette October 23, 1928.*]

DISCLAIMER.

1,645,017.—*Carl Georg Munters* and *Baltzar Carl von Platen*, Dala-Jarna and Ystad, Sweden. ABSORPTION REFRIGERATING APPARATUS. Patent dated October 11, 1927. Disclaimer filed September 28, 1928, by the assignee, by mesne assignments, *Electrolux Servel Corporation*.

Hereby enters this disclaimer to claim 5 of the aforesaid patent which is in the following words, to wit:

"5. In absorption refrigerating apparatus, the combination of a generator, an absorber, a condenser and an evaporator connected so as to form closed circulating systems for the cooling agent and the absorption liquid, including a conduit within the generator in communication with the absorber and means wholly within the generator to control flow through said conduit in response to variations of liquid level in the generator."

[*Official Gazette October 23, 1928.*]